US012053432B2

(12) United States Patent
Seo

(10) Patent No.: US 12,053,432 B2
(45) Date of Patent: Aug. 6, 2024

(54) CUSTOM SHOES FOR PREVENTING DIABETES, PREVENTING DIABETIC FOOT CAUSED BY DIABETIC COMPLICATIONS AND EASING ULCER PAIN OF DIABETIC NECROSIS

(71) Applicant: NEWSTEP, Seoul (KR)

(72) Inventor: Won-Dan Seo, Seoul (KR)

(73) Assignee: NEWSTEP, Seoul (KR)

( * ) Notice: Subject to any disclaimer, the term of this patent is extended or adjusted under 35 U.S.C. 154(b) by 1037 days.

(21) Appl. No.: 16/967,580

(22) PCT Filed: Aug. 2, 2019

(86) PCT No.: PCT/KR2019/009644
§ 371 (c)(1),
(2) Date: Aug. 5, 2020

(87) PCT Pub. No.: WO2020/032484
PCT Pub. Date: Feb. 13, 2020

(65) Prior Publication Data

US 2021/0212892 A1 Jul. 15, 2021

(30) Foreign Application Priority Data

Aug. 6, 2018 (KR) ........................ 10-2018-0091338

(51) Int. Cl.
*A61H 39/04* (2006.01)
*A43B 7/1455* (2022.01)
(Continued)

(52) U.S. Cl.
CPC ............. *A61H 39/04* (2013.01); *A43B 7/147* (2013.01); *A43B 7/32* (2013.01); *A43B 17/02* (2013.01);
(Continued)

(58) Field of Classification Search
CPC .................. A61H 39/04; A61H 39/086; A61H 2201/0165; A61H 2201/165;
(Continued)

(56) References Cited

U.S. PATENT DOCUMENTS 6,314,661 B1 * 11/2001 Chern .................... A43B 13/20 36/7.8
2008/0010868 A1 * 1/2008 Tsai ..................... A43B 13/182 36/141
(Continued)

FOREIGN PATENT DOCUMENTS

JP 4080044 B2 4/2008
KR 10-2005-0031107 A 4/2005
(Continued)

*Primary Examiner* — Justine R Yu
*Assistant Examiner* — Matthew R Moon
(74) *Attorney, Agent, or Firm* — NKL LAW; Jae Youn Kim

(57) ABSTRACT

Custom shoes for preventing diabetes, preventing diabetic foot caused by diabetic complications and easing ulcer pain of diabetic necrosis which disperse plantar pressure and prevent impact are proposed. The shoes may prevent shoes from creasing and deforming by attaching a deformation prevention frame to an external side of a sole; and increase weights of shoes by manufacturing shoes, wherein columns with which springs are embedded are formed on the bottom, an insole with massaging protrusions formed on the top of columns is attached to the top of the sole, an inner sole made of shock absorption material is attached to the top of the insole, and an upper combined to a sock lining is installed to the top of the insole.

5 Claims, 8 Drawing Sheets

(51) Int. Cl.

| | |
|---|---|
| ***A43B 7/32*** | (2006.01) |
| ***A43B 17/02*** | (2006.01) |
| ***A43B 17/06*** | (2006.01) |
| ***A43B 17/14*** | (2006.01) |
| ***A61H 39/08*** | (2006.01) |

(52) U.S. Cl.
CPC .............. *A43B 17/06* (2013.01); *A43B 17/14* (2013.01); *A61H 39/086* (2013.01); *A61H 2201/0165* (2013.01); *A61H 2201/165* (2013.01); *A61H 2201/1695* (2013.01); *A61H 2205/125* (2013.01)

(58) Field of Classification Search
CPC ...... A61H 2201/1695; A61H 2205/125; A43B 7/147; A43B 7/32; A43B 17/02; A43B 17/06; A43B 17/14; A43B 7/146; A43B 7/148; A43B 13/12; A43B 13/182; A43B 13/186; A43B 17/006; A43B 13/127
See application file for complete search history.

(56) References Cited

U.S. PATENT DOCUMENTS

| | | | | |
|---|---|---|---|---|
| 2009/0282704 | A1* | 11/2009 | Park ........................ | A43B 7/146 36/29 |
| 2011/0126422 | A1* | 6/2011 | Vattes .................. | A43B 13/145 36/28 |
| 2013/0160331 | A1* | 6/2013 | Burke .................... | A43B 7/144 36/43 |
| 2018/0008000 | A1 | 1/2018 | Chanda et al. | |
| 2020/0037700 | A1* | 2/2020 | Naiker ................... | A43B 17/02 |

FOREIGN PATENT DOCUMENTS

| | | | | |
|---|---|---|---|---|
| KR | 10-0868993 | B1 | | 11/2008 |
| KR | 10-2009-0110805 | A | | 10/2009 |
| KR | 101164112 | | * | 7/2012 |
| KR | 10-1528971 | B1 | | 6/2015 |
| KR | 101528971 | B1 | * | 4/2017 |

* cited by examiner

CUSTOM SHOES FOR PREVENTING DIABETES, PREVENTING DIABETIC FOOT CAUSED BY DIABETIC COMPLICATIONS AND EASING ULCER PAIN OF DIABETIC NECROSIS

TECHNICAL FIELD

The present invention relates to custom shoes, particularly, custom shoes for preventing diabetes, preventing diabetic foot caused by diabetic complications and easing ulcer pain of diabetic necrosis which disperse plantar pressure and prevent impact; prevent shoes from creasing and deforming by attaching a deformation prevention frame to an external side of a sole; and increase weights of shoes by manufacturing shoes, wherein columns with which springs are embedded are formed on the bottom, an insole with massaging protrusions formed on the top of columns is attached to the top of the sole, an inner sole made of shock absorption material is attached to the top of the insole, and an upper combined to a sock lining is installed to the top of the insole, and combined to the sole.

BACKGROUND ART

According to practice guideline for diabetic foot lesions published by Korea National Diabetes Program, the most miserable results among issues in relation to diabetic foot lesions are foot ulcer and lower extremity amputations. A rate in lower extremity amputations largely depends on a country and a region. Approximately 40 to 60% of atraumatic lower extremity amputations are performed on diabetic patients. In many studies, a frequency of lower extremity amputations assumes 7 to 206 per 100,000 people per year. It has been reported that the highest frequency occurs in regions where American Indians live, and the lowest frequency, in Denmark and the Great Britain. However, concerning a rate in lower extremity amputations, there are very few studies conducted to total population in developing countries. The difference of a rate in lower extremity amputations depends on research structure, demographic factors, prevalence of diabetes, registration systems, surgery costs, etc. 15 to 19% of patients with amputations first are diagnosed diabetes when having an amputation surgery. People with diabetes mostly have amputations toward lower parts of foot joint, and, consequently, there tends to assume few amputation cases in relation to diabetes in studies on upper parts of foot joint. Therefore, the consideration of the whole cases of amputations should be required over amputations. In advanced countries, specially, in countries where registration systems on diabetes or complications have not been set up, it may underestimate the number of surgery procedures. In consideration of this situation, it is estimated that the amputation rate related to common diabetes is 5 to 24 per 100,000 people, 6 to 8 per 1,000 diabetic patients per year.

In approximately 85% of diabetic patients with lower extremity amputations, foot ulcer occurs first. In several studies, a rate of patients with gangrene treatment is 50 to 70% and a rate of infected patients is 20 to 50%. Due to accompanying deep infection and ischemia in many cases, there should perform amputations. The common indications of amputation, reported in literatures, are gangrene, infection, intractable ulcer, etc. However, intractable ulcer should not mean indication of amputation.

In advanced countries, it is assumed that a rate of foot ulcer occurrence is approximately 4 to 10% of patients with diabetes and an annual occurrence rate is reported 2.2 to 5.9%. Such results are mostly based on cross-sectional survey from people with diabetes and it easily tends to be unequally distributed to people with diabetes under the age of 50. The occurrence rate of foot ulcer in studies over young patients with Type I or II diabetes assumes 1.7 to 3.3%, and 5 to 10% in old people, mostly, with Type II diabetes.

It is important that risk factors for foot ulcer should be classified into factors related to peripheral neuropathy, peripheral vascular disease, foot ulcer in progress, amputations, etc. In many cases, factors related to foot ulcer in progress are similar to those related to lower extremity amputations, but have not been proved. In studies on risk factors, young patients with Type I or II diabetes in highly-specialized foot care centers are included; the number of patients for samples are low; it corresponds to cross-sectional survey; and the whole population is not targeted.

Several factors are involved in the prevalence of foot ulcer. In most studies on Type II diabetes, men are subject to risk factors of foot ulcer and amputations.

Diabetic foot lesions occur in conjunction with two or more than two risk factors usually. In diabetic neuropathy, all (sensory, motor and autonomic) nerve fibers are invaded. Sensory neuropathy includes loss of nociception, tactile sense, temperature sense, proprioceptive sensation, etc. When losing such sense, it is hard to be well aware of destructive stimulation or injuries or feels nothing completely, thereby, leading to ulcer, consequently. Generally, kinesioneurosis includes atrophy and weakness of foot muscle, thereby causing flexion deformity of foot and gait abnormality. The bottom parts of condyle in metatarsal bones or toes, which may easily add weight, are deformed. In autonomic neuropathy, no sweating makes skin dry and causes laceration easily. Further, when flood flowing in arteriovenous shunt increases, veins on the top of foot become enlarged, thereby causing foot swelling.

Diabetic patients' flexibility is limited to joint, soft tissues, and glycation. All of various deformation of foot, gait abnormality, and flexibility limitations lead to change in biomechanical weight which may be subject to foot, thereby increasing plantar pressure and foot strains. When losing protective sensation in the foot, it is difficult to detect repetitive damages by walking, and calluses form as a normal physiological response. Acting on the skin surface in a different manner, calluses increase more pressure which is subject to localized skin. Ulcer frequently occurs not only in foot, little sensitive to touch, as an external damage, but also often works together an internal factor such as increased pressure on foot. When mechanical pressure keeps focusing on footpads, calluses form in the footpads, and cause subcutaneous bleeding, thereby finally leading to plantar ulcer.

It is important to consider a mechanical factor as a main cause of foot ulcer. As a general disorder, deformities (i.e., protrusion of head of metatarsal bone or tiptoes, etc.) of foot, subject to neurosensory disturbance, generate foot ulcer. Under neurosensory disturbance, plantar pressure increases while walking and shearing force repetitively keeps on a particular part of foot. Such force damages tissues and provokes pre-ulcer phases (bleeding in calluses, blister, or minor skin wounds). Patients with no protective sensation suffer from skin ulcer under ongoing external injuries and this may develop infectious complications.

There is a strong correlation between increase in plantar pressure and ulcer generation. Under barefoot walking, the plantar pressure may be displayed with isobar distribution in a computer screen using optics or electrical devices. Measuring the plantar pressure using electronic equipment is useful to manufacture insoles and evaluate treatment shoes. The following is the cause of abnormal pressure on foot.

Lots of biomechanical problems has been associated with diabetic foot lesions. Peripheral nerve disorder leads to increased body movements while standing, increased fall-down or external damages while walking, walking changes, foot damages (e.g., metatarsal bone fractures), etc.

Especially, calluses may be the factor in pressure increase in specific parts of footpads, thereby being always supposed to be eliminated. Further, foot under surgical operation (laser ablation or partial operation, etc.) may be the factor in pressure increase. Further, motor neuron diseases may be the factor in foot deformities. Mobility restriction of foot and foot joints is involved in increase in plantar pressure, as well.

Footpads with calluses are at 11 times of high risk for foot ulcer. As for corns, mechanical pressure keeps on foot due to hard insoles while walking; such pressure weighs on parts of the corns, thereby leading to calluses; and horny substances occur due to pressure applying to the whole corns. Meanwhile, corns occur when weight or walking habit applies to a certain foot due to abnormal walking postures or wrong postures.

Further, calluses may be the factor in pressure increase in specific parts of footpads, thereby being always supposed to be eliminated. Further, foot under surgical operation (laser ablation or partial operation, etc.) may be the factor in pressure increase. Further, motor neuron diseases may be the factor in foot deformities. Mobility restriction of foot and foot joints is involved in increase in plantar pressure, as well.

Further, according to a paper on foot care (Cha, Hye-Jeong, Diabetes Center, The Catholic University of Korea Bucheon St. Mary's Hospital) for diabetic patients in relation to diabetic foot, the following is the foot care training:

1) Control and prevention of complication of diabetes

Controlling blood sugar levels, blood pressure and Cholesterol may prevent the process of high-risk groups in complication of diabetes. It is necessary to individualize a control target in accordance with age, diabetes duration, condition of complications, and accompanying diseases.

2) Observation of foot

- Check your feet and the area in between the toes daily (observe wounds, blisters, corns, toenails, rubefaction, etc.).
- Use a mirror for observing the surface of footpad.
- As for a man with poor vision, others do instead.

3) Foot hygiene and skin care

- Wash your feet everyday with mild soap. Especially, dry thoroughly between the toes.
- Set the temperature of water below 37° C. and check the temperature with your elbow.
- To prevent dry skin, do not soak your feet in water for a long time.
- Cut toenails which become soft after bath.
- Cut toenails straight across and grind sharp edges by nail file.
- As for ingrown toenails or other toenail problems, ask a footcare specialist.
- Apply lotion or cream on dry skin, except the area between the toes.
- Do not use products containing alcohol.
- Wear the right size footware to avoid occurring calluses or corns caused by constant pressure and friction.
- Do not get rid of calluses or corns with chemicals, bands, and razors.
- To prevent burns, do not use hot water bottles or warmers.

4) Socks

- Put on clean socks daily.
- Select socks made of absorbent cotton or wool.
- Avoid tight socks or knee high socks.
- Wear socks without sewing lines.
- Do not wear patch socks or socks with holes which may put pressure and friction.

5) Shoes

- Touch shoes inside to check if there are torn or loose inner soles, foreign objects, or something irritating skin.
- Select socks which are not too tight or not too loose, big enough on the basis of the longest toe by 1 cm, and high enough for tiptoes.
- Wear shoes with shoestrings or Velcro, which may be adjusted by pressure dispersion at the side and the front when swelling feet.
- Avoid pointed toe sandals or flip flops.
- Avoid shoes with heels higher than 2.5 cm, which may stress on front toes.
- Be preferable to put on shoes in the daytime for avoiding tight shoes. If the size of each foot is different, match the size for bigger foot.
- As for new shoes for the first time, adapt the new shoes slowly by wearing for 1 to 2 hours a day.
- As for foot problems, wear treatment shoes (such as foot amputation, having foot ulcer now or in the past, etc.)

6) Blood circulation

- Avoid something which prevent or press on blood circulation (such as smoking, girdle, corset, belts, crossing legs, standing for a long time, etc.).
- For stimulating blood circulation of legs and feet, get a foot massage and perform foot exercise.

Meanwhile, as for recovering from ulcer due to diabetes, it is better to wear diabetic shoes for preventing ulcer occurrence.

The fundamental requirements for diabetic shoes are to absorb impact completely for preventing microdamage in fragile bones and muscles; to have extra width and depth in toe box; and to prevent wounds from occurring in foot due to compression caused by folded parts by smooth leather.

Further, there should be roomy inside for insoles which fit the size of feet; and the inner of shoes should be made of soft and flexible material which may be changed to the shape of feet.

Further, the front bottom of shoes is on the slant, thereby less giving pressure to the front toes; and it is not desirable to wear shoes made of hard midsoles like regular shoes in which pressure is spread on the footpad for healthy blood flow.

Accordingly, numbers of diabetic shoes for solving such objects have been manufactured.

For example, according to a method of manufacturing a polyether-urethane insole for a diabetes patent thereof, as disclosed in Korean Patent Publication No. 10-2005-0031107, as a prior art, shoes have been currently made of hard materials and thus, it had to make feet swollen by wearing shoes for a long time and to take off shoes in a car during journey, even socks. Thus, for solving such problems, it is disclosed that shoes are made of ecofriendly blowing urethane by water blowing for preventing discharge of harmful material such as dioxin, etc., and shoes are comprised of little curved inside of insoles for avoiding tightness in feet. Accordingly, since the upper side of insoles, made of polyethylene foam, keeps the shape of toes and the lower side of insoles, made of polyurethane, keeps superior restoring force, this restrains the propagation of germs by adding antifugal agents when foaming.

Further, according to footwear for a diabetes patient, as disclosed in Korean Patent Registration No. 10-0868993, it consists of: an upper leather; a plate-shaped carbon fiber panel member, made of carbon fiber and installed at the bottom of the upper leather, in which the upper and lower sides are in shape of a plane; and an outsole member, installed at the bottom of the carbon fiber panel member, in which the portion of forefoot is carved. Accordingly, it prevents and treats diabetic foot by prohibiting irregular pressure on forefoot and bending in bones of forefoot while walking; improves safety and convenience while walking by applying a high-intensity carbon fiber panel to the outsole member and outstandingly reducing thickness of the outsole member; and prevents dorsiflexion in phalangeal fracture of mesopodium.

Further, according to functional diabetic shoes, as disclosed in Korean Patent Publication No. 10-2009-0110805, it relates to shoes with insoles, which reach a wearer's toes, and outsoles, which come in direct contact with the ground, comprising: a toe partition member, installed at the front of toes in the upper part of the insoles, for partitioning toes; a stimulation member, installed at the upper side of the insoles, for stimulating toes; and a power member for supplying micro current or low frequency electric current to the toe partition member or the stimulation member.

Further, the functional diabetic shoes not only protect feet, but also promote insulin secretion and strengthen pancreas by massaging a position of pancreas in plantar reflex while walking throughout oriental medical approach. However, there is no effect in consideration of structure of shoes.

However, as for general diabetic shoes, since feet may be injured even by small stitches in shoes, there was effort which only localizes the appearance. Further, even though it is helpful for diabetic patients to wear functional shoes, most of diabetic patients do not have good blood circulation in the lower part in feet due to unidentified disease and may be easily infected on injuries. As for diabetic patients who have poor immunity, it is difficult to treat and may be rotted, even amputated.

Accordingly, there have been desperate requirement for development of shoes which may make blood circulation of diabetic patients better and overcome symptom for rotting toes.

PRIOR ART (Patent document 001) Korean Patent Publication No. 10-2005-0031107

(Patent document 002) Korean Patent Registration No. 10-0868993

(Patent document 003) Korean Patent Publication No. 10-2009-0110805

DISCLOSURE

Technical Problem

For solving above problems, the object of the present invention is to provide custom shoes for preventing diabetes, preventing diabetic foot caused by diabetic complications and easing ulcer pain of diabetic necrosis for preventing diabetes, preventing diabetic foot caused by diabetic complications and easing ulcer pain of diabetic necrosis which disperse plantar pressure and prevent impact; prevent shoes from creasing and deforming by attaching a deformation prevention frame to an external side of a sole; and increase weights of shoes by manufacturing shoes, wherein columns with which springs are embedded are formed on the bottom, an insole with massaging protrusions formed on the top of columns is attached to the top of the sole, an inner sole made of shock absorption material is attached to the top of the insole, and an upper combined to a sock lining is installed to the top of the insole, and combined to the sole.

Further, the other object of the present invention is to provide custom shoes for preventing diabetes, preventing diabetic foot caused by diabetic complications and easing ulcer pain of diabetic necrosis for directly reaching wounds by inserting custom inserts, made of EVA material, for forming holes in wounds of a user, to the top of sock lining.

Further, the other object of the present invention is to provide custom shoes for preventing diabetes, preventing diabetic foot caused by diabetic complications and easing ulcer pain of diabetic necrosis for helping pancreas and stomach by forming more columns of insoles to pancreas and stomach in plantar reflex and continuously massaging pancreas and stomach using massaging protrusions of springs.

Further, the other object of the present invention is to provide custom shoes for preventing diabetes, preventing diabetic foot caused by diabetic complications and easing ulcer pain of diabetic necrosis for outstandingly serving to prevention of diabetic foot by providing shoes wherein springs are equally spread on footpad for becoming the bottom evenly; postures may be corrected, such as straightening back, to avoid leaning in a particular direction in footpad, thereby preventing dead skin cells or corns; and under no hard midsoles and no high plantar pressure, dead skin cells, calluses or corns are not occurred or recovered.

Technical Solution

To accomplish above objects, the present invention comprises: an insole, made of synthetic resins such as urethane, including a plurality of columns on the bottom formed by a plurality of springs made by injection molding, and massaging protrusions which are protruded on the upper side of the columns; a sole, made of synthetic resins such as urethane, for comprising a space for fixing the insole on the top, and a plurality of insertion grooves for inserting the columns to the bottom of the space; a deformation prevention frame for being made of any one of materials such as plastic, rubber and metal for having elastic restoring force upon deformation and being injection molded with the sole to be attached to the side edge of the sole; an inner sole, made of shock absorbing materials such as blowing urethane foam or blowing sponge foam, for being installed on the top of the insole; a sock lining, made of low-density absorbing materials such as low-density urethane foam, which has relatively low density as compared to the inner sole, for preventing microdamage of muscles due to sharply declining elasticity depending on weight, thereby being arranged on the top of the inner sole; and an upper for being bonded to the lower edge of the inner sole and the inner side of the upper edge of the sole.

Hereinafter, the custom shoes for preventing diabetes, preventing diabetic foot caused by diabetic complications and easing ulcer pain of diabetic necrosis further comprise a custom insert, made of EVA material, for forming holes in injuries of a user and for being installed to the top of the sock lining in order to prevent injuries of a user from directly touching the sock lining.

Hereinafter, it is desirable that the columns and massaging protrusions of the insole are arranged in positions of pancreas and stomach in plantar reflex among forefoot, rearfoot, and arches.

Hereinafter, as for the columns and massaging protrusions of the insole, first air holes are formed in the center for discharging compressed air when compressing springs; and second air holes are formed at the side of the columns and massaging protrusions for discharging compressed air when compressing insoles.

Hereinafter, the deformation prevention frame is equipped with a plurality of penetrating holes for being combined to urethane, inserted inside, when injection molded with the sole.

Hereinafter, the sock lining is wrapped and attached to felt or fabric on the top and the bottom for preventing sharply declining elasticity depending on weight.

Hereinafter, the inner sole, the sock lining and the upper may be combined by using any one of Moccasin Construction, California Vulcanize Construction, and Bolognese Construction, or attached, respectively, by Cement Construction.

Advantageous Effects

According to the custom shoes for preventing diabetes, preventing diabetic foot caused by diabetic complications and easing ulcer pain of diabetic necrosis of the present invention, as constituted above, the custom shoes for preventing diabetes, preventing diabetic foot caused by diabetic complications and easing ulcer pain of diabetic necrosis according to the present invention disperse plantar pressure by springs and columns of the insole; protect weakened bones and muscles by avoiding impact; prevent dead skin cells, calluses, and corns by continuously massaging footpad during shock absorption and recovery of the insole to which the springs are inserted, and by naturally keeping warm and moisturized; and get over dead skin cells, corns, and calluses by softness and moisturizing due to impact alleviation on the bottom.

Further, midsoles are generally sticked to shoe lasts to prevent shoes from creasing according to the present invention. According to the present invention, it enables to resolve walking with a waddle due to bent or creased shoes by combining the deformation prevention frame, which acts as midsoles, and the sole integrally without using midsoles; express unique styles by exposing the deformation prevention frame outside and forming patterns in the middle of the sole; indicate a status of a patient with diabetes for helping ambulance workers or doctors easily check the status of the patient with diabetes upon emergency; and expand foot muscles due to increase of weights of shoes using the deformation prevention frame and prevent sugar, broken down in digestive systems, from discharging in a form of urine for storing sugar to muscles fast, thereby preventing diabetes.

Further, according to the present invention, by keeping on rolling smoothly while walking with using strong springs, which is to be inserted and shot out, at the rear and less stronger in the front as springs, which disperse pressure; reinforcing the rear which applies more weight; and wrapping an upper with shoe liners, shot out with fabric such as foaming sponge or urethane instead of midsoles, for manufacturing shoes, springs and columns disperse plantar pressure naturally for alleviating more impact, thereby simultaneously implementing pressure dispersion and impact alleviation, which are the essential requirements for preventing diabetic foot.

Further, according to the present invention, the bottom of shoes gets soft since shoes are manufactured without using hard midsoles; columns and projected massaging protrusions of insoles massage footpad smoothly, thereby promoting blood circulation, increasing temperature of footpad, and functioning well in warmth and moisturizing; and sock lining is made of low density urethane foam for not applying weights rapidly, thereby preventing microdamage of muscles due to sharply decreased elasticity.

Further, according to the present invention, springs are equally spread on footpad for becoming the bottom evenly; postures may be corrected, such as straightening back, to avoid leaning in a particular direction in footpad; bad postures, dead skin cells, corns, or calluses may be prevented by absorbing impact of walking softly and spreading weights of footpad equally for the even footpad; under no hard midsoles and no high plantar pressure, dead skin cells or calluses are naturally recovered by walking with shoes, thereby outstandingly serving to prevention of diabetic foot; and especially, in winter, due to insoles, in which springs are embedded, foot does not directly reach cold ground and air layers in embedded spaces of spring columns prevent cold air so that foot does not directly reach cold air, thereby keeping feet warm.

Further, according to the present invention, pressure may be dispersed by making the heights of springs a little bit different; plantar reflex is stimulated while walking with massaging protrusions in pancreas and stomach in plantar reflex, thereby helping pancreas and stomach; and for alleviating pain in case of necrosis or ulcer in diabetic foot, custom shoe insert, made of EVA material, is recorded with necrosis areas and pierced with holes, thereby reducing pain which comes from direct touch to foot and lessening stimulation.

DESCRIPTION OF THE PREFERRED EMBODIMENTS

The configuration of custom shoes for preventing diabetes, preventing diabetic foot caused by diabetic complications and easing ulcer pain of diabetic necrosis of the present invention will be described in detail with the accompanying drawings.

In the following description of the present invention, a detailed description of known incorporated functions and configurations will be omitted when to include them would make the subject matter of the present invention rather unclear. Also, the terms used in the following description are defined taking into consideration the functions provided in the present invention. The definitions of these terms should be determined based on the whole content of this specification, because they may be changed in accordance with the option of a user or operator or a usual practice.

Figure 1:
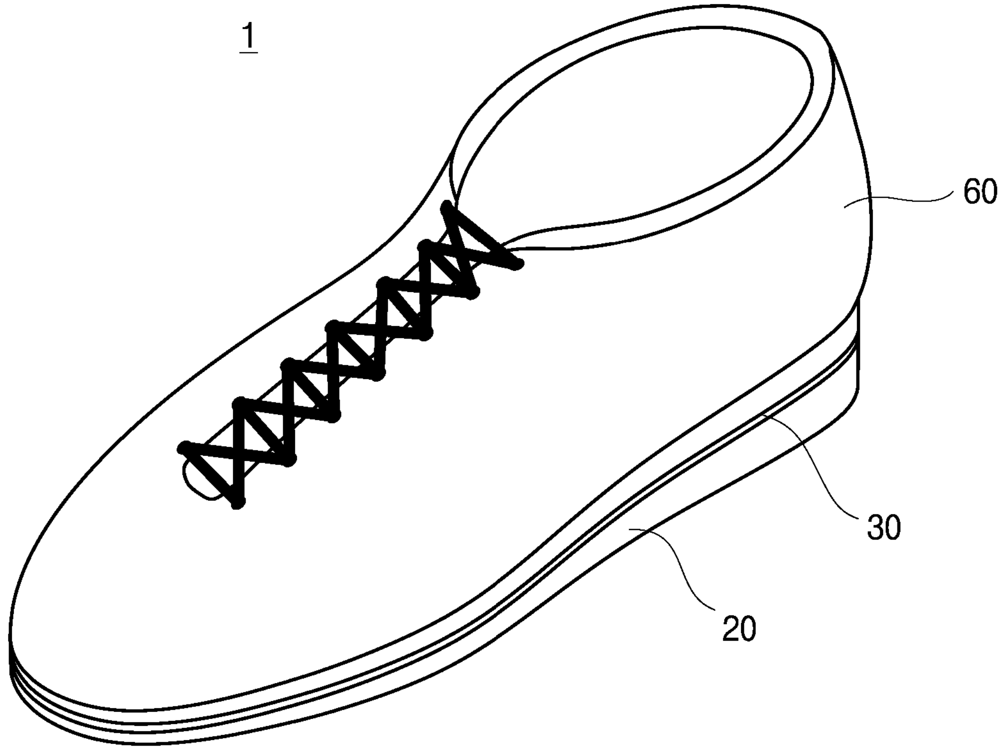
FIG. 1 illustrates a perspective view showing the constitution of custom shoes for preventing diabetes, preventing diabetic foot caused by diabetic complications and easing ulcer pain of diabetic necrosis according to the present invention.
Figure 2:
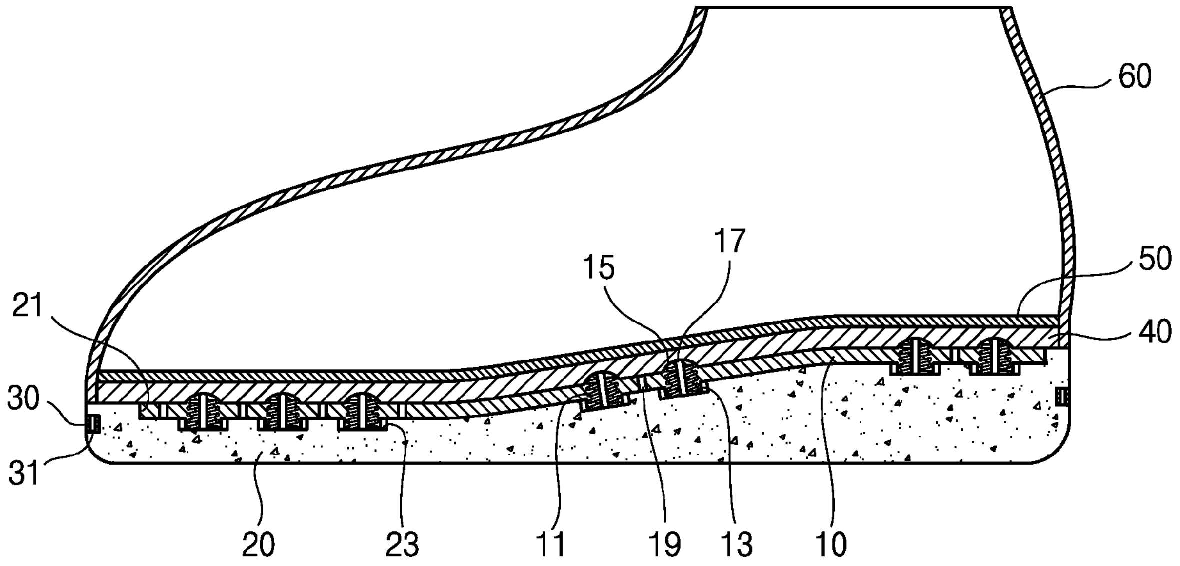
FIG. 2 illustrates an A-A fragmentary sectional view of FIG. 1.
Figure 3:
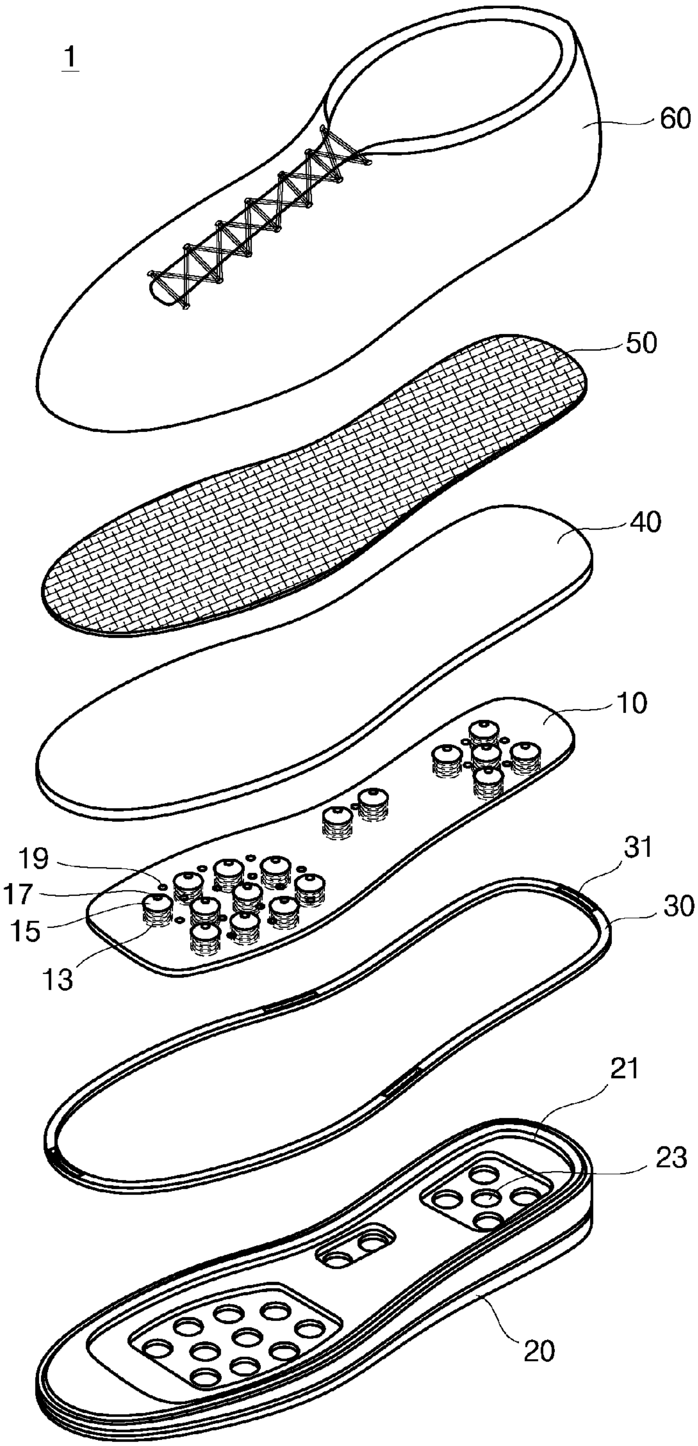
FIG. 3 illustrates an exploded perspective view of FIG. 1.
Figure 4:
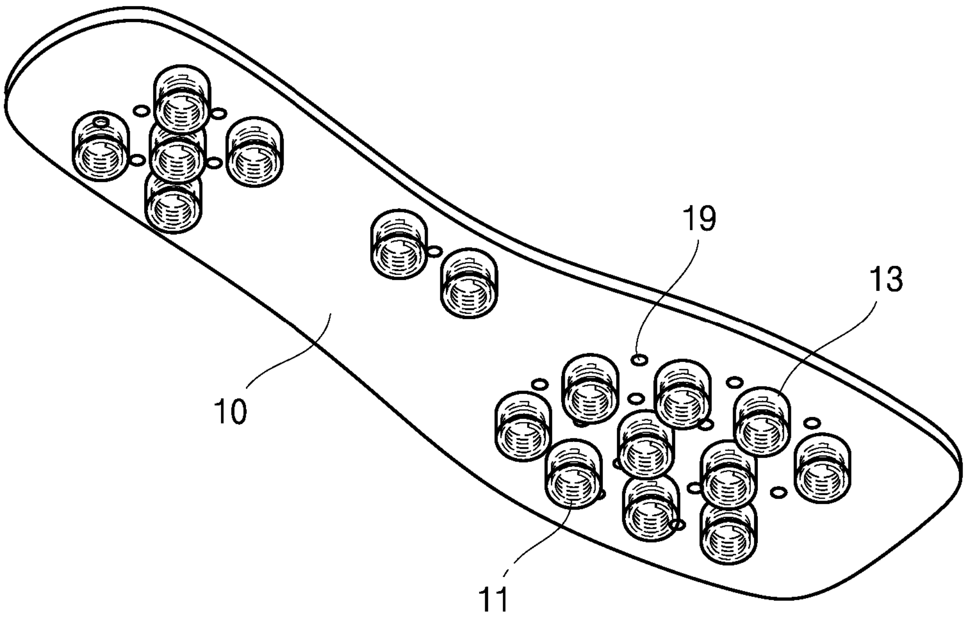
FIG. 4 illustrates a bottom perspective view showing the constitution of an insole in FIG. 3.
Figure 5:
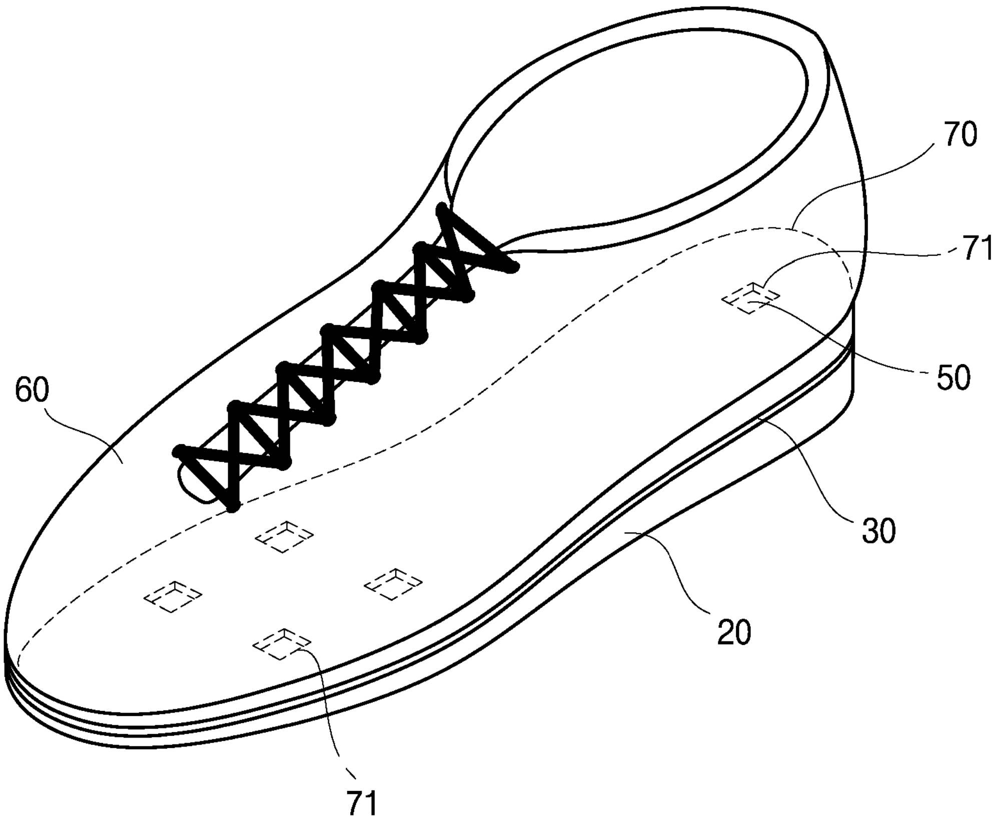
FIG. 5 illustrates a perspective view showing the constitution of custom shoes for preventing diabetes, preventing diabetic foot caused by diabetic complications and easing ulcer pain of diabetic necrosis according to other embodiment of the present invention.
Figure 6:
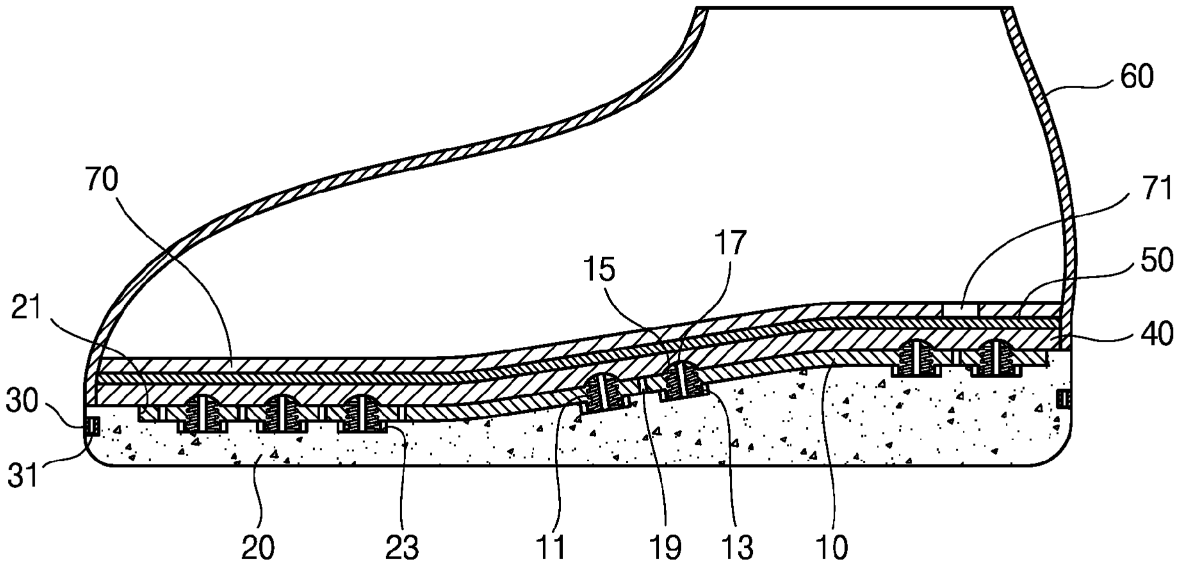
FIG. 6 illustrates a B-B fragmentary sectional view of FIG. 5.
Figure 7:
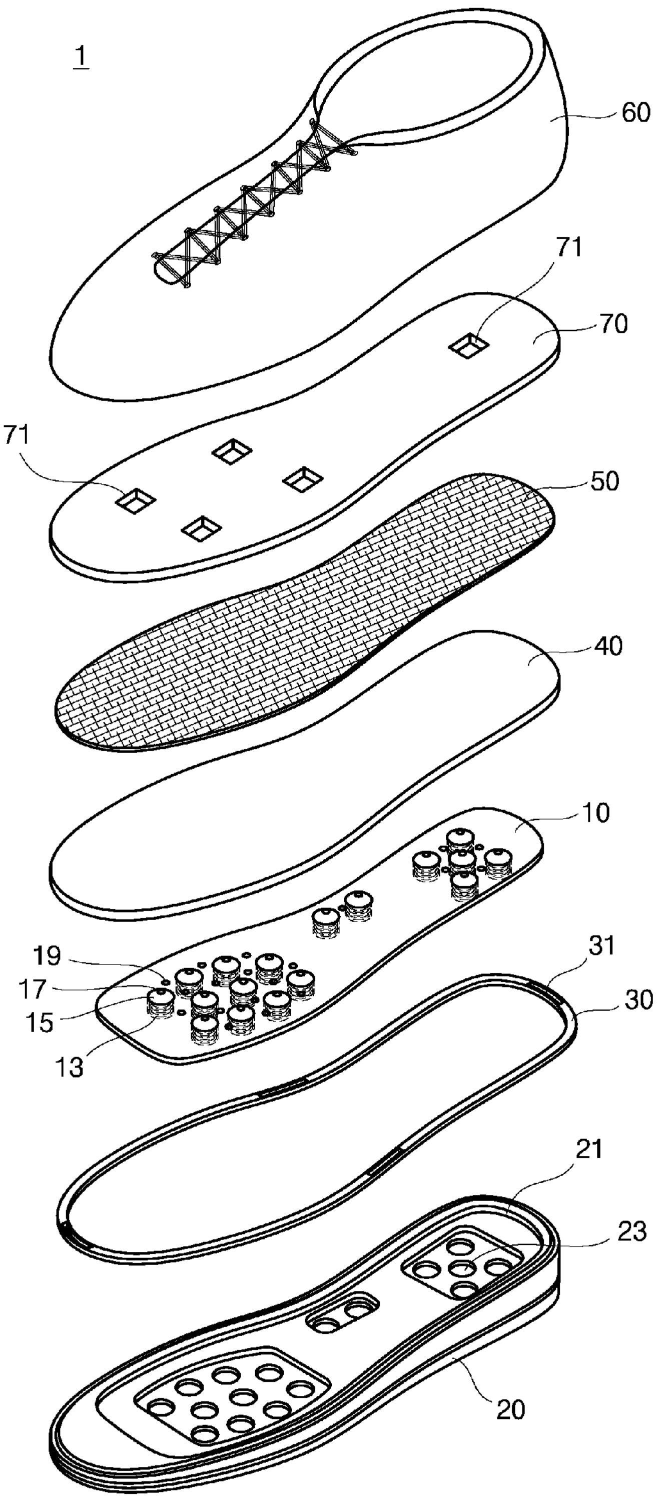
FIG. 7 illustrates an exploded perspective view of FIG. 5.
Figure 8:
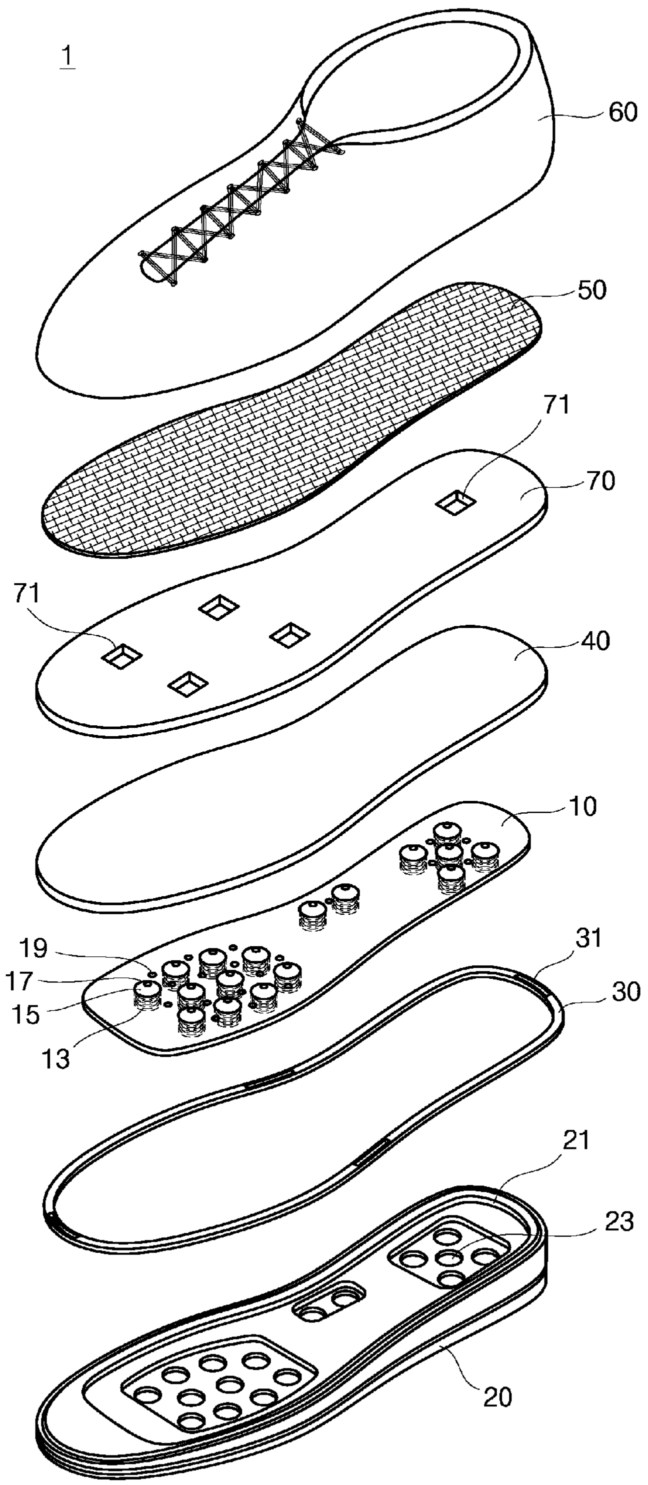
FIG. 8 illustrates an exploded perspective view of another embodiment of FIG. 5.

FIG. 1 illustrates a perspective view showing the constitution of custom shoes for preventing diabetes, preventing diabetic foot caused by diabetic complications and easing ulcer pain of diabetic necrosis according to the present invention; FIG. 2 illustrates an A-A fragmentary sectional view of FIG. 1; FIG. 3 illustrates an exploded perspective view of FIG. 1; FIG. 4 illustrates a bottom perspective view showing the constitution of an insole in FIG. 3; FIG. 5 illustrates a perspective view showing the constitution of custom shoes for preventing diabetes, preventing diabetic foot caused by diabetic complications and easing ulcer pain of diabetic necrosis according to other embodiment of the present invention; FIG. 6 illustrates a B-B fragmentary sectional view of FIG. 5; FIG. 7 illustrates an exploded perspective view of FIG. 5; FIG. 8 illustrates an exploded perspective view of another embodiment of FIG. 5.

Referring to FIGS. 1 to 8, custom shoes for preventing diabetes, preventing diabetic foot caused by diabetic complications and easing ulcer pain of diabetic necrosis(1) according to the present invention consist of an insole(10), a sole(20), a deformation prevention frame(30), an inner sole(40), a sock lining(50), and an upper(60).

First, made of synthetic resins such as urethane, the insole(10) is equipped with columns(13), which are embedded with a plurality of springs(11), injection molded on the bottom, and massaging protrusions(15) which are protruded on the upper side of the columns(13). Here, as shown in FIGS. 2 and 3, it is desirable that the columns(13) and massaging protrusions(15) of the insole(10) are arranged in positions of pancreas and stomach in plantar reflex among forefoot, rearfoot, and arches; first air holes(17) are formed in the center for discharging compressed air when compressing springs(11); and second air holes(19) are formed at the side of the columns(13) and massaging protrusions(15) for discharging compressed air when compressing insoles(10). Further, it is desirable to make the springs'(11) stiffness of forefoot and rearfoot different each other, i.e., setting the forefoot, less stiff, and the rearfoot, stiffer, thereby making the springs(11) roll smoothy while walking; and to reinforce the rearfoot which gets more weight.

Further, made of synthetic resins such as urethane, the sole(20) comprises a space(21) for fixing the insole(10) on the top, and a plurality of insertion grooves(23) for inserting the columns(11) to the bottom of the space(21).

Further, formed as the same shape of the sole with any one of materials such as plastic, rubber and metal, for having elastic restoring force upon deformation, the deformation prevention frame(30) is injection molded with the sole(20) and attached to the side edge. Here, it is desirable that the deformation prevention frame(30) is equipped with a plurality of penetrating holes(31) for being combined to urethane, inserted inside, when injection molded with the sole(20), and may be colored differently as compared to the sole(20), thereby making highly colored. Further, colors of the deformation prevention frame(30) may be set up differently in accordance with types of patients of diabetes and high blood pressure so that patients may select depending on his disease's type; and upon emergency, ambulance workers or doctors may administer first aid by easily checking diabetes and high blood pressure of patients, i.e., indicating red, "Type I diabetes", blue, "Type II diabetes", and yellow, both diabetes and high blood pressure.

Further, made of shock absorbing materials such as blowing urethane foam or blowing sponge foam, the inner sole(40) is installed on the top of the insole(10).

Continuously, the sock lining(50) is made of low-density absorbing materials such as low-density urethane foam, which has relatively low density as compared to the inner sole(40), for preventing microdamage of muscles due to sharply declining elasticity depending on weight, thereby being arranged on the top of the inner sole(40). Here, the sock lining(50) is wrapped and attached to felt or fabric on the top and the bottom for preventing sharply declining elasticity depending on weight.

Continuously, the upper(60) is bonded to the lower edge of the inner sole(40) and the inner side of the upper edge of the sole(20). Here, the upper(60) may be manufactured by any one of Moccasin Construction, California Vulcanize Construction, and Bolognese Construction, for arranging the inner sole(40) and the sock lining(50).

Meanwhile, as shown in FIGS. 5 to 7, the custom shoes for preventing diabetes, preventing diabetic foot caused by diabetic complications and easing ulcer pain of diabetic necrosis(100) according to other embodiments of the present invention further comprise a custom insert(70), made of EVA material, for forming holes(71) in injuries of a user and for being installed to the top of the sock lining(50) in order to prevent injuries of a user from directly touching the sock lining(50). Here, as shown in FIG. 8, the custom insert(70) may be arranged on the bottom of the sock lining(50).

Hereinafter, manufacturing processes for the custom shoes for preventing diabetes, preventing diabetic foot caused by diabetic complications and easing ulcer pain of diabetic necrosis according to the present invention will be described in detail with the accompanying drawing.

First, the pre-manufactured deformation prevention frame (30) is fixedly inserted into a metal mold, and urethane is put inside the metal mold to manufacture the sole(20).

Then, the external surface of the deformation prevention frame(30), exposed to the side edge of the sole(20), is combined to the sole(20), thereby preventing the sole(20) from being twisted without an additional midsole.

Then, the insole(10) sticks to the pre-manufactured sole (20) using adhesive: columns(11) of the insole(10) are inserted and adhere to insertion grooves(23) of the sole(20).

Further, the inner sole(40), the sock lining(50) and the upper(60) may be combined by using any one of Moccasin Construction, California Vulcanize Construction, and Bolognese Construction.

Under this condition, by applying adhesive to the top edge of the sole(20) and the bottom edge of the inner sole(40) of the upper(60), wherein the inner sole(40) and the sock lining(50) are combined to the bottom, for combination, the sole(20) is attached to the upper(60), thereby manufacturing shoes.

Meanwhile, as for the custom insert(70), holes(71) are arranged to an area corresponding to injuries of a user in the custom insert(70) which fits in a size of shoes and then, the custom insert(70), manufactured, may be arranged on the bottom of the sock lining(50).

Accordingly, the custom shoes for preventing diabetes, preventing diabetic foot caused by diabetic complications and easing ulcer pain of diabetic necrosis(1) according to the present invention disperse plantar pressure by springs(11) and columns(13) of the insole(10); protect weakened bones and muscles by avoiding impact; prevent dead skin cells, calluses, and corns by continuously massaging footpad during shock absorption and recovery of the insole to which the springs(11) are inserted, and by naturally keeping warm and moisturized; and get over dead skin cells, corns, and calluses by softness and moisturizing due to impact alleviation on the bottom.

Further, midsoles are generally sticked to shoe lasts to prevent shoes from creasing according to the present invention. According to the present invention, it enables to resolve walking with a waddle due to bent or creased shoes by combining the deformation prevention frame(30), which acts as midsoles, and the sole(20) integrally without using midsoles; express unique styles by exposing the deformation prevention frame(30) outside and forming patterns in the middle of the sole(20); indicate a status of a patient with diabetes for helping ambulance workers or doctors easily check the status of the patient with diabetes upon emergency; and expand foot muscles due to increase of shoes' weights using the deformation prevention frame and prevent sugar, broken down in digestive systems, from discharging in a form of urine for storing sugar to muscles fast, thereby preventing diabetes.

Further, according to the present invention, by keeping on rolling smoothly while walking with using strong springs, which is to be inserted and shot out, at the rear and less stronger in the front as springs, which disperse pressure; reinforcing the rear which applies more weight; and wrapping an upper with shoe liners, shot out with fabric such as foaming sponge or urethane instead of midsoles, for manufacturing shoes, springs and columns disperse plantar pressure naturally for alleviating more impact, thereby simultaneously implementing pressure dispersion and impact alleviation, which are the essential requirements for preventing diabetic foot.

Further, according to the present invention, the bottom of shoes gets soft since shoes are manufactured without using hard midsoles; columns and projected massaging protrusions of insoles massage footpad smoothly, thereby promoting blood circulation, increasing temperature of footpad, and functioning well in warmth and moisturizing; and sock lining is made of low density urethane foam for not applying weights rapidly, thereby preventing microdamage of muscles due to sharply decreased elasticity.

Further, according to the present invention, springs are equally spread on footpad for becoming the bottom evenly; postures may be corrected, such as straightening back, to avoid leaning in a particular direction in footpad; bad postures, dead skin cells, corns, or calluses may be prevented by absorbing impact of walking softly and spreading weights of footpad equally for the even footpad; under no hard midsoles and no high plantar pressure, dead skin cells or calluses are naturally recovered by walking with shoes, thereby outstandingly serving to prevention of diabetic foot; and especially, in winter, due to insoles, in which springs are embedded, foot does not directly reach cold ground and air layers in embedded spaces of spring columns prevent cold air so that foot does not directly reach cold air, thereby keeping feet warm.

Further, according to the present invention, pressure may be dispersed by making the heights of springs a little bit different; plantar reflex is stimulated while walking with massaging protrusions in pancreas and stomach in plantar reflex, thereby helping pancreas and stomach; and for alleviating pain in case of necrosis or ulcer in diabetic foot, custom shoe insert, made of EVA material, is recorded with necrosis areas and pierced with holes, thereby reducing pain which comes from direct touch to foot and lessening stimulation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

EXPLANATIONS OF NUMERAL REFERENCE

10: insole
20: sole
30: deformation prevention frame
40: inner sole
50: sock lining
60: upper
70: custom insert

The invention claimed is:

1. A pair of custom shoes for mitigating diabetic feet caused by diabetic complications and easing an ulcer pain of diabetic necrosis, comprising:

an insole, made of urethane, including a plurality of columns disposed on a bottom thereof, the plurality of columns having a plurality of springs disposed inside each column, respectively, and massaging protrusions which are protruded on an upper side of each column;

a sole, made of urethane, defining a space for fixing the insole on a top of the sole, and including a plurality of insertion grooves for inserting the plurality of columns;

a deformation prevention frame being made of one of plastic, rubber and metal and having an elastic restoring force upon deformation and being attached to a side edge of the sole;

an inner sole, made of blowing urethane foam or blowing sponge foam, being installed on a top of the insole;

a sock lining, made of low-density urethane foam, which has a low density as compared to the inner sole, for mitigating damage of muscles due to declining elasticity depending on a weight applied thereto, thereby being arranged on a top of the inner sole;

an upper for being bonded to a lower edge of the inner sole and an inner side of an upper edge of the sole; and a custom insert, made of ethylene-vinyl acetate (EVA) material, including holes and configured to be installed to a top of the sock lining in order to mitigate the damage by preventing the feet from directly touching the sock lining, wherein the deformation prevention frame includes a plurality of penetrating holes disposed inside the sole, and the deformation prevention frame is colored in accordance with types of the user's health condition and disease, and wherein the plurality of columns comprises a plurality of front columns disposed on a front portion of the insole, a plurality of middle columns disposed on a middle portion of the insole, and a plurality of rear columns disposed on a rear portion of the insole, and the plurality of front, middle and rear columns are equally spread in each portion of the front, middle and rear portions of the insole, such that the plurality of springs are equally spread in each portion of the front, middle and rear portions, and stiffness of each of the plurality of springs in the front portion is different from stiffness of each of the plurality of springs in the rear portion.

2. The pair of custom shoes according to claim 1, wherein the columns and massaging protrusions of the insole are arranged in positions of pancreas and stomach in plantar reflex among forefoot, rearfoot, and arches.

3. The pair of custom shoes according to claim 1, wherein first air holes are formed in a center of each massaging protrusions, respectively, for discharging compressed air when the plurality of springs are compressed; and second air holes are formed around the plurality of columns and the massaging protrusions for discharging the compressed air when the insole is compressed.

4. The pair of custom shoes according to claim 1, wherein the sock lining is wrapped and attached to felt or fabric on the top of the sock lining and a bottom thereof for mitigating the declining elasticity.

5. The pair of custom shoes according to claim 1, wherein the inner sole, the sock lining and the upper are configured to be combined by using one of Moccasin Construction, California Vulcanize Construction, and Bolognese Construction, or attached, respectively, by Cement Construction.

* * * * *